United States Patent Office 3,146,119
Patented Aug. 25, 1964

3,146,119
PIGMENT TREATMENT
Hartien S. Ritter, Akron, Ohio, assignor to Pittsburgh Plate Glass Company, Pittsburgh, Pa., a corporation of Pennsylvania
No Drawing. Filed July 3, 1961, Ser. No. 121,327
18 Claims. (Cl. 106—300)

This invention relates to the treatment of titanium dioxide pigment particles produced by the vapor phase oxidation of $TiCl_4$. Particularly, this invention relates to the surface coating of these pigment particles with metal oxides in a novel fashion to thereby improve the pigment's characteristics.

One of the general methods for preparing titanium dioxide is by vapor phase oxidation of $TiCl_4$. Generally this involves subjecting in the vapor phase titanium tetrachloride and oxygen to elevated temperatures normally in excess of about 800° C. Though titanium dioxide produced by the vapor phase oxidation of $TiCl_4$ has good pigmentary properties, the optimum properties required of such a pigment in paints is generally not thoroughly developed. For example, the durability of these pigments in outdoor paints is, as a rule, somewhat less than the paint formulator and consumer finds desirable. In addition, titanium dioxide pigment as produced does not always have the degree of resistance to yellowing found necessary in paints, especially paints employed for indoor use.

It has been found that vapor phase titanium dioxide pigment possessing advantageous qualities of durability and non-yellowing, among other properties, in paint can be provided by treating the pigment under carefully controlled conditions so as to deposit thereupon concentrated HCl-soluble aluminum oxide and HCl-soluble $TiO_2$. One of the most significant results of this invention is the pigment's marked increase in tinting strength.

These advantages accrue when such coating of vapor phase produced titanium dioxide pigment is achieved by flocculation of the pigment from an acidic aqueous hydrolyzable aluminum and titanium containing coating solution having therein a mole concentration of chloride ions exceeding the total mole concentration of other acid anions. The term acid anion is meant to encompass only those anions obtained from aqueous solutions of strong mineral acids, such as sulfate, nitrate, fluoride and bromide.

In accordance with this process, an aqueous slurry of titanium dioxide pigment produced by vapor phase oxidation of $TiCl_4$ is formed. In this slurry is dissolved certain titanium and aluminum compounds. Titanium compounds within the purview of this invention are those which on aqueous acid or alkaline hydrolysis form orthotitanic acid, condensates thereof (preferably partial or water-soluble condensates) or mixture thereof and aqueous solutions to which is added these titanium compounds. Examples of usable titanium compounds are $TiCl_4$, titanium esters (e.g., tetraethyl titanate, tetra-2-chloroethyl titanate, tetraoctyl titanate and tetraphenoxy titanium) tetraacyloxy titanium (e.g., tetraacetyl titanium and tetrabutyric titanium). Aluminum compounds within the purview of this invention are those which on acid or alkaline hydrolysis form $Al(OH)_3$ (aluminum hydroxide), condensates thereof, mixtures of $Al(OH)_3$ and the condensates and aqueous solutions to which is added these aluminum compounds. Condensates is meant to include low molecular weight $Al_2O_3$ containing hydroxyl groups. The latter condensates can be characterized as a low molecular weight aluminoxy polymer having the formula.

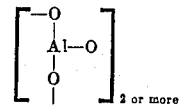

the free valences of which are attached to H, alkoxy, aryloxy acyloxy, $-Al(OH)_2$ radicals or cross-linked with other materials of the same unit formula. Examples of usable aluminum compounds are $AlCl_3$, alkyl and aryl aluminum (e.g., triethyl aluminum, trihexyl aluminum and triphenyl aluminum), alkoxy and aryloxy aluminum (e.g., triethoxy aluminum, tributoxy aluminum and triphenoxy aluminum)), acyloxy aluminum (e.g., triacetyl aluminum) and cyclic aluminoxy trimers, such as trimethoxy trialuminoxy. The preferred compounds are $TiCl_4$ and $AlCl_3$ or aqueous solution to which each, alone or together, is added.

The pigment slurry containing the aforementioned titanium and aluminum compound is maintained at a pH of less than 5, preferably less than 3.5, as a result of providing therein a sufficient amount of acid anions, the majority of which are chloride ions. The desired chloride ion concentration may be effected as a result of the residual chloride concentration of the titanium dioxide pigment and/or the chloride concentration resulting from the titanium or aluminum compound added thereto, and/or by the addition of sufficient Hcl to give the desired result. Thus, the molecular majority of the acidic anions in the slurry, prior to separation of the pigment from the slurry, (i.e., more than 50 mole percent, preferably more than 65 to 75 mole percent, of the acid anions) should be chloride ions. A small amount of other acid anions (e.g., sulfate and nitrate) may be present in the slurry.

The pH of the acidified slurry is then raised to a level at which the pigment, coated with the hydrolyzed titanium and aluminum compounds, flocculates or coagulates. The floc is then filtered, washed, dried and milled, in that order. The end product is pigmentary titanium dioxide coated with HCl-soluble $TiO_2$ and HCl-soluble aluminum oxide.

The dried pigment has a coating which gives a tinting strength in accordance with A.S.T.M. D-332-36 ("1949 Book of A.S.T.M. Standards," Part 4, page 31, published by American Society of Testing Material, Philadelphia 3, Pennsylvania), 20 to 60 or more points higher than when the acid pH of the process is effected by employing a mole majority of, e.g., sulfate anions rather than chloride.

From the standpoint of this invention, the addition of the aforementioned titanium and aluminum compounds, and/or the silicon compounds described hereinafter, to an aqueous solution followed by the addition of the solution to the aqueous pigment slurry is to be construed as the same as adding these compounds per se to the aqueous pigment slurry. The former technique, in terms of results, is no different from the latter. The only material difference relates to the degree of dilution of the slurry. This can be compensated for by controlling the amount of water in the aqueous slurry prior to the addition.

A further embodiment of this invention involves coating silica ($SiO_2$) on the $TiO_2$ pigment, in addition to the aforementioned concentrated HCl-soluble aluminum oxide and HCl-soluble titanium dioxide coatings. It has been found that when a silica coating is placed on the pigment in a particular sequence of steps, there results an increase in the pigment's tinting strength above that obtained when the pigment is coated with concentrated HCl-soluble aluminum oxide and HCl-soluble $TiO_2$ in the above-described manner.

In accordance with the process of this invention, titanium dioxide pigment (particle size range of from about 0.05 to 0.50 micron, generally from 0.10 to 0.35 micron, preferably from 0.15 to 0.25 micron) as produced by the vapor phase oxidation of $TiCl_4$, is combined with water (preferably deionized or distilled water) to form a slurry. Due to the pigment's chloride content, there is generally obtained an aqueous dispersion having a pH of about 5 or less, preferably below 3.5. A slurry can be formed containing up to 70 percent by weight of $TiO_2$, if desired.

If the titanium dioxide pigment (hereinafter termed "pigment") is neutralized by, e.g., calcination degassing techniques, the aqueous slurry must be acidified to effect intimate dispersion of the pigment therein. Any strong acid may be used to acidify the slurry, but it is preferable to employ a mineral acid, notably HCl, or $AlCl_3$ and/or $TiCl_4$.

Considerable latitude in pigment concentration in the slurry is permissible without materially effecting the results of the process of this invention. On the other hand, when the process is employed in large scale continuous treatment of pigment, it is advisable to maintain control on the pigment concentration. Typically, the pigment concentration in the slurry is between about 150 and about 350 grams or more of pigment per liter of water. Preferably, the pigment concentration is from about 200 to about 300 grams per liter since in this range the slurry has a viscosity found most desirable in further processing steps.

After the pigment slurry is formed, $AlCl_3$ and $TiCl_4$ is added (if not already added to effect the desired pH), with or without silicic acid (aqueous solution to which is added a hydrolyzable tetrafunctional silicon compound) and the desired chloride ion concentration established. The slurry is then neutralized to precipitate the pigment in flocculated form containing hydrolyzed $AlCl_3$, $TiCl_4$ and condensed silicic acid.

As indicated above, titanium dioxide exists well dispersed in an aqueous slurry, i.e., when the pH of the slurry is below about 5. At a pH above about 5, the pigment starts to coagulate from the slurry in floc form. A floc is formed when at least two pigment particles flocculate, that is, become lightly cemented. These flocs can be readily broken up to the ultimate particle by grinding. As the pH of the floc-containing slurry is raised above 7 to above about 8.3 while agitated, the flocculated pigment becomes redispersed in the slurry. In the pH ranges around 5 or 8.3, flocculation can be inhibited by stirring the slurry. Thus, at a pH of, e.g., 5.4 or 8.1, effective dispersion of pigment is achieved by stirring the slurry.

As a rule, any alkaline material may be employed for neutralizing the acid slurry, i.e., bring the slurry into the floc-forming range (pH 5 to 8.3). Preferably, the alkaline material forms a halogen salt which is soluble in the liquid medium employed to wash the flocculated pigment. Some alkaline materials found suitable for this purpose are ammonia, alkali and alkaline earth metal hydroxides or carbonates (e.g., KOH, NaOH, LiOH, $Ca(OH)_2$, $Mg(OH)$, $CaCO_3$, $K_2CO_3$, $Na_2CO_3$, $KHCO_3$ and $NaHCO_3$), primary amines (e.g., ethylene diamine or ethyl amine), secondary amines (e.g., diethanol amine or diethylene triamine), tertiary amines (e.g., pyridine or triethylamine), and quaternary ammonium hydroxides (e.g., benzyl trimethyl ammonium hydroxide). Included are polymeric materials, such as, water-soluble polyvinylpyridinium hydroxide or polyvinylpyridinium carbonate.

The pigment floc can be washed with an extractant, e.g., water, ketones (e.g., actone and methyl ethyl ketone), alcohols (e.g., ethanol, propanol and 2-ethyl hexanol, ethers (e.g., diethyl oxide, dioxane and tetrahydrofuran), to remove impurities, such as salts. The pigment is then gently heated at temperatures sufficient to evaporate any residual extractant present on the pigment. The dried pigment may then be ground while in dry state in a ball mill, jet mill or fluid energy mill (micronizer) as described in U.S. Patent No. 2,737,460.

In some instances, when the pigment, as produced, contains undesirably large particles, e.g., in excess of 3 microns, a hydroseparation step may be employed prior to the coating step. Such separations may be effected by simply allowing the acidic aqueous slurry to stand for a few minutes to one or more hours. In commercial operation, hydroseparators, such as a Dorrclone or Bird centrifuge may be effectively used. Since these separators are not made of acid resistant materials, alkaline material should be added to the slurry to bring the pH of the slurry over the flocculation range, i.e., above about 8.3. But if a dispersing agent is employed, e.g., sodium silicate, to aid the pigment's water dispersion, a pH of 7 and above may be employed. In the process of raising the pH, the slurry will pass through the flocculation range resulting in the formation of a small quantity of pigment flocs. Efforts should be made to reduce the amount of flocculation. This can be done by adding the alkaline material as rapidly as possible, thus reducing the period of time the slurry is in this range.

After the larger particles have separated from the slurry, it is again made acidic by the addition of acid to a pH below about 5, preferably below 3.5. To the slurry is added $AlCl_3$ and $TiCl_4$ as described above. Acidification can be effected simply by using the $AlCl_3$ and $TiCl_4$ for the dual function of reducing the pH below 3.5 and effecting the desired coating.

In detail, the order of addition of aluminum or titanium compounds may be varied to a considerable extent. For example, either $AlCl_3$ or $TiCl_4$ may be added first or both may be added together. On the other hand, $AlCl_3$ and $TiCl_4$ may be premixed in an aqueous solution and as such added to the pigment slurry. Either $AlCl_3$ or $TiCl_4$ may be first added to the slurry and the slurry flocculated by neutralization. The slurry may then be acidified by the addition of the other salt, e.g., $AlCl_3$ or $TiCl_4$ and again neutralized to flocculate the pigment coated with concentrated HCl-soluble aluminum oxide and HCl-soluble $TiO_2$.

The amount of aluminum compound, preferably $AlCl_3$, added to the slurry, determined as percent by weight of aluminum oxide coated on the pigment, basis weight of pigment, can range from 0.05 percent to 15 percent, desirably from 0.5 to 7 percent, and for most applications, from 1.0 to 5 percent. The titanium compound, preferably $TiCl$, may be added in amounts sufficient to coat the pigment with about 0.1 to 4 percent by weight HCl-soluble $TiO_2$, basis weight of pigment.

To gain optimum advantages from the above coatings, about 1.0 percent or more of HCl-soluble $TiO_2$ should be coated on the pigment, basis weight of pigment, when the amount of aluminum oxide coated on the pigment is about 3 percent or more, basis weight of pigment. At lower HCl-soluble $TiO_2$ contents, the aluminum oxide coating (if it exceeds about 3 percent) tends to aggregate the pigment thereby reducing its dispersibility. These adverse results are evidenced by the pigment's slight reduction in tinting strength and fineness of grind in paints.

Silica coating on the pigment may be effected during or jointly with the aforementioned coating steps. Thus an aqueous solution of silicic acid, condensed silicic acid or mixtures thereof, may be introduced to the acid slurry at the time of addition of $AlCl_3$ and $TiCl_4$. By silicic acid, it is meant aqueous solutions of $Si(OH)_4$, $SiO(OH)_2$, and their hydrolyzates or water-soluble condensates. Instead of silicic acid, $SiCl_4$, $SiH_4$, $Si(OOCCH_3)_4$, $Si(OCH_3)_4$, $Si(NH_2)_2$, $Si(NH_2)_4$, or $Si(OCH_2CH_3)_4$ or other hydrolyzable silicon compounds may be added to the slurry. Aqueous solutions to which have been added the above compounds may be employed.

The silicon compounds which are usable are termed as those which on acid or alkaline hydrolysis form silicic acid, condensed silicic acid and mixtures thereof. It is known that any silicon compound, be it mineral or polyorganosiloxane, can be made into a water-soluble hydrolyzable tetrafunctional compound by treatment with strong acid or alkali, with or without the use of superatmospheric pressure and heat. Thus, slurries of these decomposition products may be employed.

The amount of $SiO_2$ coated on the pigment, weight percent $SiO_2$ basis weight of pigment, should range from about 0.01 to about 1.0 percent.

A silica coating in addition to a combined HCl-soluble aluminum oxide and HCl-soluble $TiO_2$ on the pigment enhances the pigment's resistance to caking when packed in bags and held in storage for long periods of time. The addition of a small quantity (.01 to .05 part by weight of pigment) of monoalkylsilane, e.g., methyltrichlorosilane, to the slurry after the addition of the other coating agents further benefits the pigment in this respect.

In addition to these advantages it has been found that when the silica coating is effected in a particular manner, an increase in tinting strength is found to result over that obtained with combined aluminum oxide and HCl-soluble $TiO_2$ coating. Furthermore, when $SiO_2$ is coated in accordance with this preferred method there is noted a material reduction in the pigment's downward drifting of pH after neutralization. Without this coating, the pH of the pigment tends to significantly drift downwardly from the slightly alkaline to the slightly acidic range.

To gain the optimum effect of these benefits, an aqueous solution of silicic acid, e.g., aqueous acidified $$Na_2O \cdot 3.3SiO_2$$

(pH below 4.5, preferably below 2.0) is added with $TiCl_4$ to the aqueous pigment slurry. After a short digestion period of a few minutes or more (e.g., 5 minutes to 4 hours), $AlCl_3$ is added to the slurry. These same benefits accrue by first adding $AlCl_3$, then digesting and then adding the silicic acid with $TiCl_4$. Instead of acidified sodium silicate, there may be employed the aforementioned silicon compounds. In making silicic acid solutions, it is desirable to maintain the water content thereof at a concentration of at least 3 moles, preferably at least 4 moles of $H_2O$ per mole of Si in the solution. The temperature of the solution should be held as low as possible, preferably below 25° C. This should assist in reducing the degree of dehydration of the silicic acid.

In view of the downward drift in pH of the pigment after the coated pigment is recovered or while in floc form in the slurry, it is found best to precipitate the pigment at a pH on the high side of flocculation range, i.e., pH of 7.4 to about 8.3, thus compensating for the drift. To assist in reducing the acid content absorbed by the pigment, the slurry should be held at that pH for a short period of time, e.g., ½ to 4 hours. A shorter or longer digestion period may be employed under favorable circumstances. During this digestion, the temperature may be above the freezing point of the slurry to above its boiling point. Preferably, it is held between 20° C. to 80° C.

The coating solutions, $TiCl_4$, $AlCl_3$ and silicic acid, may be added at room temperature and the temperature may be raised during the digestion period. It has been found desirable to maintain the slurry's temperature in the order of, e.g., 60 to 80° C. during the whole process or during the digestion period. This range improves flocculation, ease of filtering and washing of the precipitates.

The slurry containing the coated flocs is filtered, washed and then dried at a temperature in excess of the boiling point of the washing medium (extractant). The dried pigment is then ground in a mill, particularly a fluid energy mill, such as a micronizer.

The following examples illustrate the manner in which this invention may be performed.

EXAMPLE I

A coating solution was formed by dissolving 474 grams of $AlCl_3 \cdot 6H_2O$ (aluminum chloride hexahydrate) in distilled water. Ice was added to the $AlCl_3$ solution and 475.4 grams of $TiCl_4$ was added. To this solution was added distilled water to bring its total volume up to 2.25 liters.

Three hundred fifty grams of titanium dioxide containing 1.41 percent by weight of alumina resulting from co-oxidizing $AlCl_3$ with $TiCl_4$ by the vapor phase technique was slurried in 2 liters of distilled water giving a pH of 3.9. While stirring continuously, 40 milliliters of the above coating solution was added. The pH was then raised from 1.35 to 7.40 with $NH_4OH$. The pigment then coagulated from the solution in the form of flocs. The floc containing slurry was filtered and washed with distilled water in a Buchner funnel. The washed pigment was dried at 110° C. in an oven, then screened through a 32 mesh screen and finally milled in a 2-inch laboratory micronizer.

EXAMPLE II

The same procedure employed in Example I was repeated except that the titanium dioxide pigment to be coated contained 1.92 percent by weight alumina as a result of co-oxidation. When 400 grams of this pigment was slurried in 2 liters of distilled water, the slurry gave a pH of 4.05. While stirring continuously, 45 milliliters of a coating solution, as prepared in Example I, and 9.5 grams of $AlCl_3$ in distilled water were simultaneously added. The pH was raised from 1.35 to 7.45 using $NH_4OH$ and the slurry was filtered and washed in a Buchner funnel. The pigment was dried at 110° C., passed through a 32 mesh screen and milled in a 2-inch laboratory micronizer.

The results from the treatment as described in Examples I and II are listed in Table I.

TABLE I

|  | Example I | Example II |
| --- | --- | --- |
| Tinting strength of uncoated pigment | 1,550 | 1,520 |
| Tinting strength of coated pigment | 1,630 | 1,600 |
| Percent $Al_2O_3$ on uncoated pigment | 1.41 | 1.92 |
| Percent $Al_2O_3$ on coated pigment | 1.92 | 2.82 |
| Percent HCl-soluble $TiO_2$ on coated pigment | 1.2 | 1.0 |
| pH (finished pigment) | 5.45 | 4.40 |

The tinting strengths were determined in accordance with A.S.T.M. D-332-36.

The percent by weight of concentrated HCl-soluble aluminum oxide coated on the pigment, basis weight of pigment, in the above table and the following examples is expressed in terms of $Al_2O_3$ present in and on the pigment.

EXAMPLE III

Two hundred fifty grams of titanium dioxide pigment, containing approximately 1.56 percent by weight $Al_2O_3$ and produced by the vapor phase oxidation of $TiCl_4$, were slurried in 1 liter of distilled water giving a pH of 3.95. 28.5 milliliters of a coating solution (described below) was added to the slurry and stirred 20 minutes. The pH after addition of the coating solution was 1.40. The pH of the slurry was raised to 7.5 with $NH_4OH$ and filtered using a Buchner funnel. Two liters of distilled water was employed to wash the filter cake, which was then dried at 110° C. in an oven. After drying, the pigment was screened through a 32 mesh screen and micronized in a 2-inch micronizer.

The coating solution was formed by adding 474 grams of $AlCl_3 \cdot 6H_2O$ and 475.4 grams of $TiCl_4$ to 1 liter of distilled water and adding a further amount of distilled water to bring the volume up to 2.25 liters.

The following results were noted:

|  | Uncoated pigment | Coated pigment |
| --- | --- | --- |
| Tinting strength (A.S.T.M. D-332-36) | 1,500 | 1,680 |
| Percent $Al_2O_3$ | 1.56 | 2.07 |
| Percent HCl-soluble $TiO_2$ | None | 1.0 |
| pH | 3.95 | 7.4 |

EXAMPLE IV

Eight thousand grams of untreated titanium dioxide pigment containing $Al_2O_3$ produced by the vapor phase oxidation of $TiCl_4$ and $AlCl_3$ was slurried in about 30 gallons of distilled water and the pH was raised from 4.5 to 10.5 with $NH_4OH$ to provide a dispersion for hydroseparation. After thorough stirring to break up any pigment flocs, the sample was allowed to stand for 16 hours to settle out particles and aggregates larger than 3 microns. At the end of this period, the pigment remaining in suspension was siphoned off and the residue dried and weighed. The residue was found to weigh 448 grams or 5.6 percent of the total sample. This residue contained appreciable quantities of particles less than 3 microns, but further separation of these particles was not effected due to the small total quantity involved.

The pH of the hydroseparated slurry containing the suspended pigment was lowered to 7.8 with HCl to effect flocculation and settling. After the pigment had thoroughly settled, the total volume of the slurry was reduced by siphoning off the clear supernate to give a pigment concentration of 200 grams per liter.

A steam coil was then inserted in the slurry and its temperature was raised to 60° C. and held at that temperature for the remainder of the coating and flocculation steps.

Three separate samples, A, B and C, of the above slurry were treated, samples B and C by the following procedure:

To sample B or C of the above slurry was added a coating solution in an amount sufficient to provide an additional 1 percent by weight HCl-soluble $TiO_2$ and 1 percent by weight aluminum oxide (determined as $Al_2O_3$) coating. The pH of the slurry was thus reduced to about 1.7. $NH_4OH$ was then added to raise and stabilize the slurry's pH at 7.4, thereby flocculating the coated pigment. The coated pigment was filtered and washed with distilled water and dried at 110° C. in an oven. The dried pigment was screened through a 32 mesh screen and micronized with a 2-inch laboratory micronizer.

Sample A comprised 2.5 liters of the above slurry containing 500 grams of pigment. No coating was applied to this sample. The sample was filtered, washed, dried and micronized as above described.

Sample B comprised 2.0 liters of the above slurry containing 400 grams of pigment. To the sample was added, in the above described manner, an aqueous coating solution of $TiOSO_4$ and $Al_2(SO_4)_3 \cdot 18H_2O$ in an amount aimed to give a 1 percent HCl-soluble $TiO_2$ and 1 percent aluminum oxide (determined as $Al_2O_3$) coating on the pigment. The slurry was then treated as described above.

Sample C comprised 2.0 liters of the above slurry containing 400 grams of pigment. To the sample was added, in the above described manner, a coating solution of $TiCl_4$ and $AlCl_3 \cdot 6H_2O$ in an amount aimed to give a 1 percent HCl-soluble $TiO_2$ and 1 percent $Al_2O_3$ coating on the pigment. The slurry was then treated as described above. The results of the above procedures are listed in Table II.

TABLE II

|  | Sample A | Sample B | Sample C |
| --- | --- | --- | --- |
| Milled tinting strength (pebble mill) | 1,540 | 1,580 | 1,600 |
| Micronized tinting strength | 1,540 | 1,580 | 1,620 |
| Percent by weight $Al_2O_3$ | 2.09 | 3.36 | 2.70 |
| Percent by weight HCl-soluble $TiO_2$ | 0.58 | 1.8 | 1.6 |

The following example illustrates the advantages secured by adding a silica coating in accordance with the preferred embodiment.

EXAMPLE V

Standard

Five hundred grams of pigment, produced by the vapor phase oxidation of $TiCl_4$ and $AlCl_3$, was added with stirring to 2 liters of distilled water in a 3-liter beaker to form a slurry. The slurry was heated to 60° C. using a 3-liter beaker mantle controlled through a powerstat. 32.7 grams of $Al_2(SO_4)_3 \cdot 18H_2O$ was added to the 60° C. slurry and stirred for 12 minutes to allow for dissolution and dispersion. 11.88 grams of $TiCl_4$ added to an aqueous solution (sufficient to produce 5 grams of $TiO_2$ therein) was added to the slurry. The slurry was stirred for 12 minutes to allow for dispersion. Sufficient ammonium hydroxide was added to raise the pH to 8.5. The slurry was then digested at 60° C. for 30 minutes before the floc was filtered. After filtering the floc in a Buchner funnel, the filter cake was washed with five 1-liter portions of distilled water. The filter cake was oven dried at 110 to 115° C., screened through a 32 mesh screen and then micronized in a 2-inch laboratory micronizer.

Sample A

Five hundred grams of pigment obtained from the same batch as that employed in making the above Standard was added, with stirring, to 2 liters of distilled water in a 3-liter beaker. The same procedure as described in producing the above Standard was employed, except that after the pH was raised to 8.5, the following was done: 2.5 grams of $SiO_2$ was added to the slurry as an aqueous $Na_2O \cdot 3.3SiO_2$ solution and 12 minutes was allowed for dispersion; enough hydrochloric acid was added to the 60° C. slurry to lower the pH to 5.4 and the slurry was stirred for 12 minutes; sufficient ammonium hydroxide was then added to the 69° C. slurry to raise its pH to 8.5 and the slurry was digested at 60° C. for 30 minutes before filtering the floc. After filtering the floc in a Buchner funnel, the filter cake was washed with five 1-liter portions of distilled water. The filter cake was oven dried at 110 to 115° C., screened through a 32 mesh screen and then micronized in a 2-inch laboratory micronizer.

Sample B

Five hundred grams of pigment obtained from the same batch as that employed in making the above Standard was added, with stirring, to 2 liters of distilled water in a 3-liter beaker. The resulting slurry was heated to 60° C. using a 3-liter beaker mantle controlled through a powerstat. Sufficient ammonium hydroxide was added to the 60° C. slurry to raise its pH to 8.0. 2.5 grams of $SiO_2$ was added to the neutralized slurry as an aqueous sodium silicate solution as described in Sample A above, and 12 minutes with stirring was allowed for dispersion. Enough hydrochloric acid was added to the slurry to lower the pH to 5.5, and it was stirred for 12 minutes. 32.7 grams of $Al_2(SO_4)_3 \cdot 18H_2O$ was added to the 60° C. slurry, and 12 minutes of stirring was allowed for dissolution and dispersion. Then an aqueous solution, to which was added 11.88 grams of $TiCl_4$ (sufficient to produce 5 grams of $TiO_2$), was added to the slurry and 12 minutes of stirring was allowed for dispersion. Sufficient ammonium hydroxide was added to the 60° C. slurry to raise the pH to 8.5. The slurry was then digested at 60° C. for 30 minutes before filtering. The slurry was filtered in a Buchner funnel and the filter cake was washed with five 1-liter portions of distilled water. The cake was then dried, screened and micronized according to the procedure employed for Sample A.

*Sample C*

The same procedure employed in making Sample A was followed, except that (1) instead of neutralizing with $NH_4OH$ after the addition of aluminum sulfate and aqueous $TiCl_4$ solution, there was added 2.5 grams of $SiO_2$ silicic acid sol in hydrochloric acid followed by 12 minutes of stirring, and (2) the additional amount of hydrochloric acid added in making Sample A was not added in making Sample C.

*Sample D*

Five hundred grams of a pigment obtained from the same batch as that employed for the Standard and the previous Samples A through C was added, with stirring, to 2 liters of distilled water in a 3-liter beaker. The slurry was heated to 60° C. using a 3-liter beaker mantle controlled through a powerstat. An aqueous solution to which was added 11.88 grams of $TiCl_4$ (sufficient to produce 5 grams of $TiO_2$) was added to the slurry, and 12 minutes with stirring was allowed for dispersion therein. Then 2.5 grams of $SiO_2$ added as an aqueous solution of sodium silicate, as described in Sample A, was added to the slurry and the slurry was digested with stirring for 90 minutes at 60° C. Sufficient ammonium hydroxide was then added to raise te pH to 7.0, and the slurry was stirred for 12 minutes. 32.7 grams of $Al_2(SO_4)_3 \cdot 18H_2O$ was added to the neutral slurry and 12 minutes of stirring was allowed for dissolution and dispersion. Sufficient ammonium hydroxide was added to the 60° C. slurry to raise its pH to 8.5. The slurry was then digested at 60° C. for 30 minutes before filtering. The pH of the slurry, as in the above samples, had decreased below 8.3 so that well-formed flocs were found in the slurry. The slurry was filtered in a Buchner funnel and washed with five 1-liter portions of distilled water. The washed cake was then treated as described in Sample A above.

Table III serves to give a chemical analysis of the HCl-soluble aluminum oxide, the HCl-soluble $TiO_2$ and silica content of the pigment samples, and the various materials are evaluated as to their tinting strengths (according to the A.S.T.M. procedure cited above) and pH.

TABLE III

| | Chemical Analysis (percent by weight) | | | Tinting strength (micronized) | pH |
|---|---|---|---|---|---|
| | $Al_2O_3$ | HCl-soluble $TiO_2$ | $SiO_2$ | | |
| Standard | 3.7 | 1.2 | .04 | 1,460 | 6.4 |
| Sample A | 3.6 | 1.3 | .59 | 1,510 | 7.5 |
| Sample B | 3.6 | 1.3 | .63 | 1,470 | 6.8 |
| Sample C | 3.6 | 1.2 | .63 | 1,450 | 7.6 |
| Sample D | 3.7 | 1.3 | .60 | 1,550 | 7.9 |

The following procedure was employed for determining the amount of concentrated HCl-soluble aluminum oxide contained on the vapor phase pigment.

An X-ray analysis of the amount of $Al_2O_3$ contained in and on the coated pigment is made. To 5 grams of this pigment is added 150 milliliters of concentrated hydrochloric acid. The resulting slurry is stirred for a few minutes to disperse all the pigment therein. The dispersion is then left to stand for 8 hours. During this time the pigment is flocculated out of dispersion. The supernate is decanted. The above acid treatment is repeated twice except that the period of standing for the first repetition is extended to 16 hours. The last repetition employs a standing period of 8 hours.

One hundred fifty milliliters of distilled water is then added to the acidic flocs from which the supernate was removed. After stirring for a short period, the slurry is passed through filter paper and the pigment is collected thereon. The collected pigment is washed 2 times with distilled water and, lastly, with acetone. The pigment on the filter paper is oven dried at 110° C. for 16 hours. X-ray analysis of the dried pigment is taken to determine the amount of $Al_2O_3$ contained in the pigment.

The amount of concentrated HCl-soluble aluminum oxide on the pigment, expressed in terms of $Al_2O_3$, is determined as the amount of $Al_2O_3$ contained in the coated pigment from X-ray analysis minus the amount of $Al_2O_3$ contained in the pigment after the above hydrochloric acid wash.

The amount of concentrated HCl-soluble aluminum oxide is expressed as amount of $Al_2O_3$ in the above examples for convenience in analysis. Thus, the actual weight of said aluminum oxide (generally $Al(OH)_3$) on the pigment in each of the above examples is greater than that listed in the examples by the weight of, as a rule, three hydroxyl groups for every mole of aluminum.

The HCl-soluble $TiO_2$ content is determined by boiling a slurry of the coated pigment in concentrated hydrochloric acid and measuring the titanium content of the resulting supernate.

The aforementioned vapor phase titanium dioxide can be produced by various techniques. For example, a stream of a mixture of $TiCl_4$ and oxygen or air passed to the central zone of a reaction chamber maintained at reaction temperature (generally above 800° C.) by either a separate stream of a burning fuel or burning fuel mixed with the oxygen results in the production of pigmentary titanum dioxide. Another technique involves passing preheated separate streams of $TiCl_4$ and $O_2$ through multiple concentric tubes annularly arranged to allow mixing and reaction to produce pigmentary titanium dioxide. Another method involves passing vaporized $TiCl_4$ and oxygen containing gas to a heated inert fluid bed wherein the reactants are mixed and the pigment is produced. The pigmentary products produced by these methods and others wherein $TiCl_4$ and $O_2$ are reacted at temperatures generally exceeding 800° C., and in some cases, lower than 800° C., may be treated according to the process of this invention with the resulting advantages indicated above.

Though the above disclosure is specific as to details of this invention, the invention is not to be construed as so limited except as to limitations imposed by the claims.

I claim:

1. A process which comprises establishing an aqueous slurry having a pH below about 5 and which contains titanium dioxide pigment produced by the vapor phase oxidation of $TiCl_4$, adding thereto sufficient titanium compound which on hydrolysis forms a compound from the group consisting of (a) titanic acid, (b) condensed titanic acid and (c) mixtures of (a) and (b) to coat the pigment with from 0.1 to 4 percent HCl soluble $TiO_2$ by weight of the pigment, and sufficient aluminum compound which on hydrolysis forms a compound from the group consisting of (d) $Al(OH)_3$, (e) condensed $Al(OH)_3$ and (f) mixtures of (d) and (e) to coat the pigment with from 0.05 to 15 percent aluminum oxide by weight of the pigment, maintaining chloride ions in the slurry in an amount exceeding the mole concentration of the other acid anions in said slurry, raising the pH of the slurry so that flocs of said pigment coagulate in said slurry, and recovering the flocculated pigment from the slurry.

2. A process which comprises establishing an aqueous slurry having a pH below about 5 and which contains titanium dioxide pigment produced by the vapor phase oxidation of $TiCl_4$, adding thereto sufficient titanium compound which on hydrolysis forms a compound from the group consisting of (a) titanic acid, (b) condensed titanic acid and (c) mixtures of (a) and (b) to coat the pigment with from 0.1 to 4 percent HCl soluble $TiO_2$ by weight of the pigment, and sufficient aluminum compound which on hydrolysis forms a compound from the group consisting of (d) Al(OH)₃, (e) condensed Al(OH)₃ and (f) mixtures of (d) and (e) to coat the pigment with from 0.05 to 15 percent aluminum oxide by weight of the pigment, maintaining chloride ions in the slurry in an amount exceeding the mole concentration of the other acid anions in said slurry, raising the pH of the slurry so that flocs of said pigment coagulate in said slurry, separating the flocculated pigment from the slurry and milling said pigment.

3. In the process of coating the surface of titanium dioxide pigment produced by the vapor phase oxidation of titanium tetrachloride, the improvement which comprises forming a slurry of said pigment in an aqueous medium, adding to said slurry sufficient titanium compound which on hydrolysis forms a compound from the group consisting of (a) titanic acid, (b) condensed titanic acid and (c) mixtures of (a) and (b) to coat the pigment with from 0.1 to 4 percent HCl soluble TiO₂ by weight of the pigment, and sufficient aluminum compound which on hydrolysis forms a compound from the group consisting of (d) Al(OH)₃, (e) condensed Al(OH)₃ and (f) mixtures of (d) and (e) to coat the pigment with from 0.05 to 15 percent aluminum oxide by weight of the pigment, establishing an amount of chloride ions in said slurry greater than the mole concentration of other acid anions in said slurry while holding the pH of the slurry below about 5, raising the pH of the slurry so that flocs of said pigment are coagulated, separating said pigment from the aqueous medium, milling said flocculated pigment and recovering pigmentary titanium dioxide coated with HCl-soluble TiO₂ and Al₂O₃.

4. In the process of coating the surface of titanium dioxide pigment produced by the vapor phase oxidation of titanium tetrachloride, the improvement which comprises forming a slurry of said pigment in an aqueous medium, adding to said slurry sufficient titanium compound which on hydrolysis forms a compound from the group consisting of (a) titanic acid, (b) condensed titanic acid and (c) mixtures of (a) and (b) to coat the pigment with from 0.1 to 4 percent HCL soluble TiO₂ by weight of the pigment and sufficient aluminum compound which on hydrolysis forms a compound from the group consisting of (d) Al(OH)₃, (e) condensed Al(OH)₃ and (f) mixtures of (d) and (e) to coat the pigment with from 0.05 to 15 percent aluminum oxide by weight of the pigment, establishing a chloride ion concentration in the slurry which exceeds 65 mole percent of the acid anions in said slurry, and maintaining the pH of the slurry below about 5, raising the pH of the slurry above about 5 to coagulate the pigment as flocs, separating the flocs from the aqueous medium, drying and milling said flocculated pigment to recover pigmentary titanium dioxide coated with alumina and HCl-soluble titanium dioxide.

5. The process which comprises establishing a slurry of titanium dioxide pigment produced by the vapor phase oxidation of TiCl₄ in an aqueous medium, adding sufficient titanium tetrachloride and aluminum chloride to said slurry to coat the pigment with from 0.1 to 4 percent HCl soluble TiO₂ and from 0.05 to 15 percent aluminum oxide by weight of the pigment, maintaining the chloride ion concentration in said slurry in excess of 75 mole percent of the acid anions present in said slurry and maintaining the pH of the slurry below about 5, raising the pH of the slurry above about 5 to coagulate flocs of said pigment, and recovering said flocculated pigment from the aqueous medium.

6. The process which comprises establishing a slurry of titanium dioxide pigment produced by the vapor phase oxidation of TiCl₄ in an aqueous medium, dissolving sufficient titanium tetrachloride and aluminum chloride in said slurry to coat the pigment from 0.1 to 4 percent HCl soluble TiO₂ and from 0.05 to 15 percent aluminum oxide by weight of the pigment, maintaining the chloride ion concentration in said slurry in excess of 75 mole percent of the acid anions present in said slurry and maintaining the pH of the slurry below about 5, raising the pH of the slurry above about 5 to coagulate flocs of said pigment, separating said flocculated pigment from the aqueous medium, drying and milling said pigment.

7. In the process of coating the surface of titanium dioxide pigment produced by the vapor phase oxidation of titanium tetrachloride, the improvement which comprises forming a slurry of said pigment in an aqueous medium, adding to said slurry an aqueous solution to which is added TiCl₄ and an aqueous solution to which is added aluminum chloride, the amounts of TiCl₄ and aluminum chloride so added to the slurry being sufficient to coat the pigment with from 0.1 to 4 percent HCl soluble TiO₂ and from 0.05 to 15 percent aluminum oxide by weight of the pigment, establishing in the slurry a chloride ion concentration which exceeds 75 mole percent of the acid anions in the slurry and maintaining the pH of the slurry below about 5, raising the pH of the slurry above 5 to coagulate the pigment as flocks, recovering the flocculated pigment from the medium.

8. In the process of coating the surface of titanium dioxide pigment produced by the vapor phase oxidation of titanium tetrachloride, the improvement which comprises forming a slurry of said pigment in an aqueous medium, adding to said slurry an aqueous solution to which is added TiCl₄ and aluminum chloride, the amounts of TiCl₄ and aluminum chloride so added to the slurry being sufficient to coat the pigment with from 0.1 to 4 percent HCl soluble TiO₂ and from 0.05 to 15 percent aluminum oxide by weight of the pigment, establishing in the slurry a chloride ion concentration which exceeds 75 mole percent of the acid anions in the slurry and maintaining the pH of the slurry below about 5, raising the pH of the slurry above 5 to coagulate the pigment as flocs, separating the flocs from the aqueous medium, drying and milling said flocculated pigment.

9. The process which comprises establishing a slurry of titanium dioxide pigment produced by the vapor phase oxidation of TiCl₄ in an aqueous medium, adding thereto sufficient titanium compound which on hydrolysis forms a compound from the group consisting of (a) titanic acid, (b) condensed titanic acid and (c) mixtures of (a) and (b) to coat the pigment with from 0.1 to 4 percent HCl soluble TiO₂ by weight of the pigment, and sufficient silicon compound which on hydrolysis produces compounds from the group consisting of (x) silicic acid, (y) condensed silicic acid and (z) mixtures of (x) and (y) to coat the pigment with from 0.01 to 1.0 percent SiO₂ by weight of the pigment, establishing the pH of the slurry below about 5, raising the pH of the slurry so that flocs of said pigment are coagulated therefrom, introducing sufficient aluminum compound which on acid hydrolysis forms a compound from the group consisting of (d) Al(OH)₃, (e) condensed Al(OH)₃ and (f) mixtures of (d) and (e) to coat the pigment with from 0.05 to 15 percent aluminum oxide by weight of the pigment, establishing a chloride ion concentration in said slurry exceeding the mole concentration of other acid anions contained therein, and maintaining the pH of said solution below about 5, raising the pH of the slurry to flocculate said pigment from said slurry, and recovering said flocculated pigment.

10. The process which comprises establishing a slurry of titanium dioxide pigment produced by the vapor phase oxidation of TiCl₄ in an aqueous medium, adding thereto sufficient titanium compound which on hydrolysis forms a compound from the group consisting of (a) titanic acid, (b) condensed titanic acid and (c) mixtures of (a) and (b) to coat the pigment with from 0.1 to 4 percent HCl soluble $TiO_2$ by weight of the pigment, and sufficient silicon compound which on hydrolysis produces compounds from the group consisting of (x) silicic acid, (y) condensed silicic acid and (z) mixtures of (x) and (y) to coat the pigment with from 0.01 to 1.0 percent $SiO_2$ by weight of the pigment, establishing the pH of the slurry below about 5, raising the pH of the slurry so that flocs of said pigment are coagulated therefrom, introducing sufficient aluminum compound which on hydrolysis forms a compound from the group consisting of (d) $Al(OH)_3$, (e) condensed $Al(OH)_3$ and (f) mixtures of (d) and (e) to coat the pigment with from 0.05 to 15 percent aluminum oxide by weight of the pigment, establishing a chloride ion concentration in said slurry exceeding 65 mole percent of the acid anions contained therein, and maintaining the pH of said solution below about 5, raising the pH of the slurry to flocculate said pigment from said slurry, separating said flocculated pigment from the aqueous medium, and recovering the treated titanium dioxide pigment.

11. The process of claim 9 wherein said titanium compound is $TiCl_4$.

12. The process of claim 9 wherein the titanium compound is added as an aqueous solution to which is added $TiCl_4$.

13. The process of claim 11 wherein the aluminum compound is aluminum chloride.

14. The process of claim 12 wherein the aluminum compound is added as an aqueous solution to which is added $AlCl_3$.

15. The process of claim 10 wherein the aluminum compound is aluminum sulfate.

16. The process of claim 10 wherein the aluminum compound is introduced as an aqueous solution to which is added aluminum sulfate.

17. The process of claim 9 wherein the silica compound is added to the slurry of titanium dioxide pigment as an aqueous solution of sodium silicate.

18. A process which comprises establishing an aqueous slurry having a pH below about 5 and which contains titanium dioxide pigment produced by the vapor phase oxidation of $TiCl_4$, adding thereto sufficient titanium compound which on hydrolysis forms a compound from the group consisting of (a) titanic acid, (b) condensed titanic acid and (c) mixtures of (a) and (b) to coat said pigment with from 0.1 to 4 percent HCl soluble $TiO_2$ by weight of the pigment, and sufficient aluminum compound which on hydrolysis forms a compound from the group consisting of (d) $Al(OH)_3$, (e) water-soluble condensed $Al(OH)_3$ and (f) mixtures of (d) and (e) to coat said pigment with from 0.05 to 15 percent aluminum oxide by weight of said pigment, and sufficient silicon compound which on hydrolysis forms a compound from the group consisting of (x) silicic acid, (y) condensed silicic acid and (z) mixtures of (x) and (y) to coat the pigment with from 0.01 to 1.0 percent $SiO_2$ by weight of the pigment, and chloride ions in an amount exceeding the mole concentration of other acid anions in said slurry, raising the pH of the slurry so that flocs of said pigment coagulate in said slurry, and recovering the flocculated pigment from the slurry.

References Cited in the file of this patent

UNITED STATES PATENTS

| | | |
|---|---|---|
| 2,571,150 | Mayer | Oct. 16, 1951 |
| 2,622,964 | Aagaard et al. | Dec. 23, 1952 |
| 2,671,031 | Whately | Mar. 2, 1954 |
| 2,998,321 | Evans et al. | Aug. 29, 1961 |